United States Patent [19]

Graham

[11] Patent Number: 4,727,304
[45] Date of Patent: Feb. 23, 1988

[54] PHASE SEQUENCER FOR STEPPING MOTOR

[75] Inventor: Patricia A. Graham, Lexington, Ky.

[73] Assignee: IBM Corporation, Armonk, N.Y.

[21] Appl. No.: 928,946

[22] Filed: Nov. 10, 1986

[51] Int. Cl.$^4$ .................................................. H02P 8/00
[52] U.S. Cl. ..................................... 318/696; 318/685
[58] Field of Search ............................. 318/696, 685; 340/347 P

[56] References Cited

U.S. PATENT DOCUMENTS

| | | | |
|---|---|---|---|
| 3,117,268 | 1/1964 | Madsen | 318/283 |
| 3,304,480 | 2/1967 | Ko | 318/138 |
| 3,345,547 | 10/1967 | Dunne | 318/138 |
| 4,145,644 | 3/1979 | Liu | 318/696 |
| 4,146,873 | 3/1979 | Yamamaka et al. | 340/347 P |
| 4,414,498 | 11/1983 | Gessner | 318/696 |
| 4,518,904 | 5/1985 | MacLeod et al. | 318/685 |

*Primary Examiner*—William M. Shoop, Jr.
*Assistant Examiner*—M. Bergmann
*Attorney, Agent, or Firm*—Pollock, Vande Sande & Priddy

[57] ABSTRACT

By examining parity for a bit combination representing the present phase state of a stepping motor, a selection can be made as to which phase state should be changed in order to produce rotation of the step motor in a predetermined direction. By including within the parity determination not only the present phase state of the stepping motor, but the logic level of a direction bit (DIR), appropriate phase sequence for either CW or CCW rotation can be selected. In a hardware embodiment of the invention, a conventional parity generator module is used with inputs representing the present motor phase states as well as a logic level for a DIR bit. The output of the parity generator then determines which phase state to change to produce the desired rotation. In a software embodiment, a digital computer dedicates a phase state byte with a bit from each motor phase state and an additional DIR bit. Parity can be determined using a conditional branch on parity instruction or merely summing the phase direction byte. In either event, the state of the motor phase is changed depending upon the result of the parity determination in order to produce the desired rotation.

12 Claims, 11 Drawing Figures

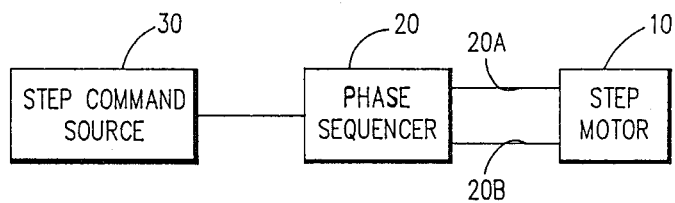
FIG. 1
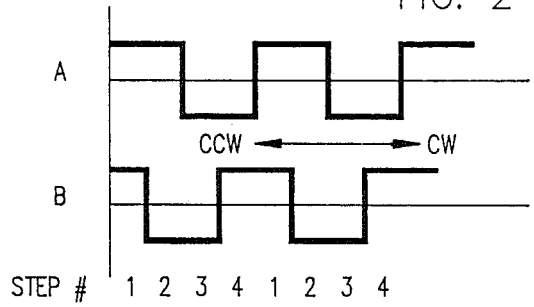
FIG. 2
FIG. 3A
| STEP # | A | B |
|---|---|---|
| 1 | + | + |
| 2 | + | − |
| 3 | − | − |
| 4 | − | + |
OR
FIG. 3B
| A | B |
|---|---|
| 0 | 0 |
| 0 | 1 |
| 1 | 1 |
| 1 | 0 |
FIG. 3C
```
         PARITY
           E   CCW
   ↓       0    ↑
  CW       E
           0
```
FIG. 4
| | A | B | DIR | PARITY |
|---|---|---|---|---|
| CW ↓ | 0 | 0 | 0 | E |
| | 0 | 1 | 0 | 0 |
| | 1 | 1 | 0 | E |
| | 1 | 0 | 0 | 0 |
FIG. 5
| | A | B | DIR | PARITY |
|---|---|---|---|---|
| CCW ↓ | 0 | 0 | 1 | 0 |
| | 1 | 0 | 1 | E |
| | 1 | 1 | 1 | 0 |
| | 0 | 1 | 1 | E |

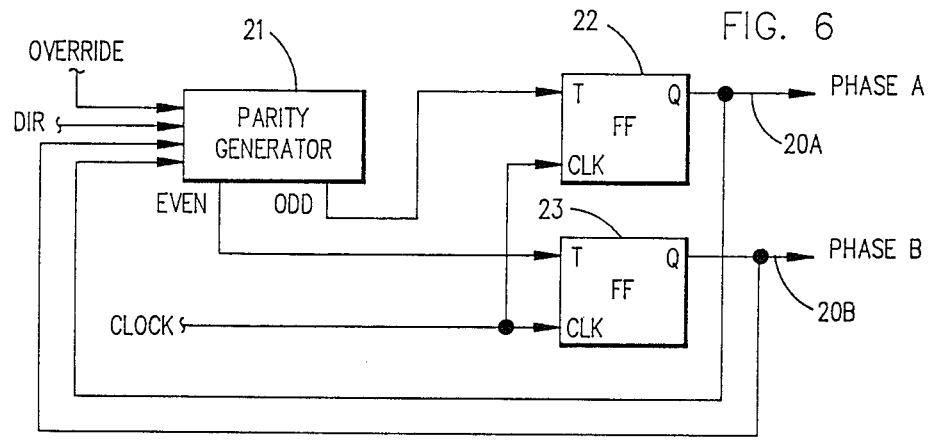
FIG. 6
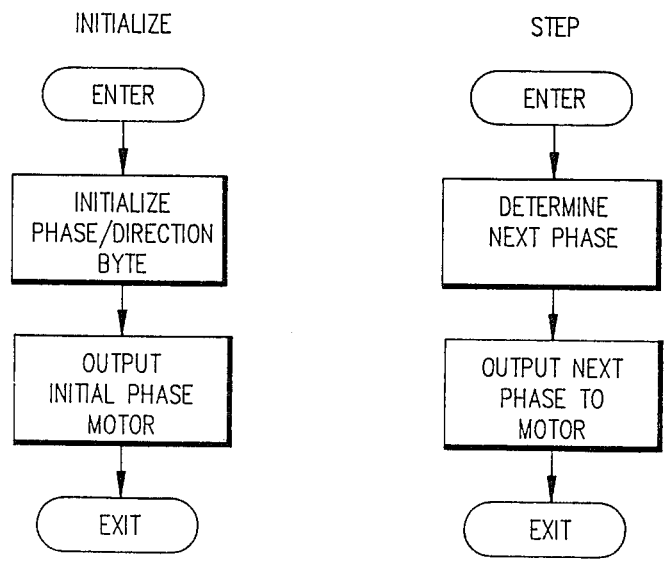
FIG. 7A
INITIALIZE
ENTER
↓
INITIALIZE PHASE/DIRECTION BYTE
↓
OUTPUT INITIAL PHASE MOTOR
↓
EXIT
FIG. 7B
STEP
ENTER
↓
DETERMINE NEXT PHASE
↓
OUTPUT NEXT PHASE TO MOTOR
↓
EXIT

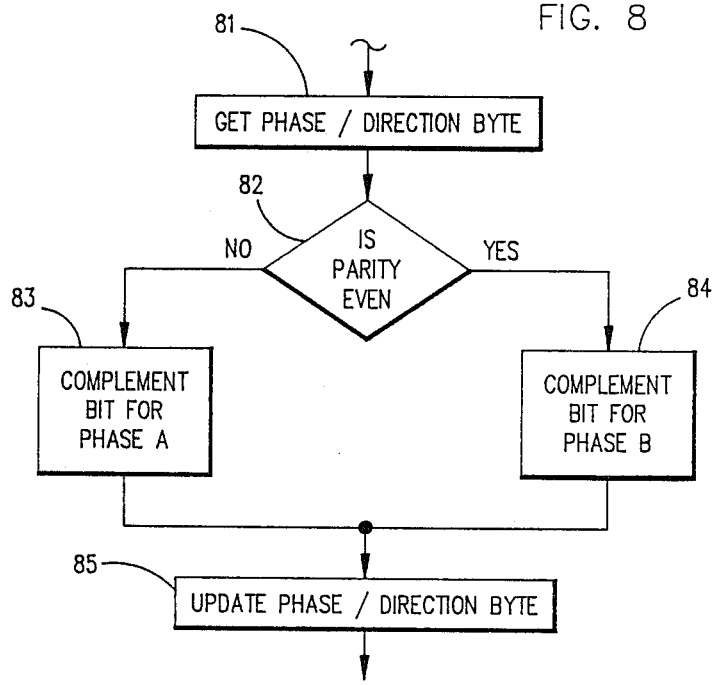

PHASE SEQUENCER FOR STEPPING MOTOR

DESCRIPTION

1. Technical Field

The invention relates a phase sequencer for a stepping motor.

2. Background Art

A stepping motor is a specialized form of motor whose attributes include producing controlled amounts of translation or rotation. Although the stepping motor employs a rotating magnetic field, as does more conventional motors, the stepping motor allows control over the rotation of the magnetic field in discrete steps. The motor includes a rotor whose motion follows that of the magnetic field. As is common, the rotor is fixed on a shaft, and the rotation of the shaft, or the translation of some other element by reason of the rotation of the shaft is the motor output.

The stepping motor also includes a stator with a number of poles and a number of windings or winding sets. Selective energization of the windings or winding sets, coupled with their location about the pole pieces, produces a magnetic field of a given field orientation. By altering which of the windings or winding sets are energized and which are not (or the polarity of the energization), the field orientation of the magnetic field can be altered in a series of discrete steps. Typical control arrangements for a stepping motor include a phase sequencer to select the windings or winding sets which are energized at any time, from those which are not, and to change the pattern of energized/deenergized windings in a predetermined sequence.

One form of a stepping motor is called a two phase, four step motor. Each phase includes a different winding or winding set, and each phase is capable of being energized with energy of one of two polarities. By sequentially altering the phase which is energized, and the polarity with which it is energized, the rotor can be made to assume four different step positions, in sequence. For one such sequence the rotor rotates in a clockwise direction and if the sequence is reversed the rotor rotates in a counterclockwise direction.

Phase sequencers used to produce an appropriate sequence of phase energizing signals in the prior art use either counter, a decoder, or a combination of counter/decoder. In some cases the decoder is actually a memory look up device. In each case additional logic is necessary in order to provide bidirectional stepping capability. Examples of prior art phase sequencers include Madsen U.S. Pat. No. 3,117,268; Ko U.S. Pat. No. 3,304,480; Dunne U.S. Pat. No. 3,345,547; Gessner U.S. Pat. No. 4,414,498 and MacLeod U.S. Pat. No. 4,518,904.

It is desirable for the phase sequencer to be capable of responding to two inputs, a first input defining a desired direction of motion (clockwise or counterclockwise, for example) and a second input identifying the rate, typically the second input is a pulse sequence or pulse train. The Madsen phase sequencer is of limited capability since he requires two different pulse inputs (one at 11 and the other at 12—FIG. 1) for respectively different directions of rotation. In Gessner a counter 28 is employed along with a decoder corresponding to gates 30-30C. MacLeod is an example of a memory lookup arrangement.

FIG. 2 is an illustration of a typical phase sequence for a two phase, four step motor, including phases A and B. Each phase is either energized in a positive (+) or negative (−) condition, corresponding to carrying current in one direction or the other. Assuming that at one time phases A and B are plus, the motor can be stepped in one direction (for example CW) by changing the polarity of energization in phase B to minus. Rotation of the motor can be continued in the same direction by thereafter changing the polarity of the energization of the A phase to minus. Finally, the polarity of energization of the B phase can then be changed to plus to complete the sequence. The sequence is listed in FIG. 3A. The motor can also be stepped in the opposite direction by reversing the order or sequence of the phase states.

FIGS. 2 and 3A can, as already described, refer to a bipolar motor. However, the figures can also represent a unipolar motor; in this case A and B each denote a pair of bifilar windings, and the motor is stepped by switching the current flow from one winding in one of the pairs to the other winding in the same pair.

SUMMARY OF THE INVENTION

It is an object of the invention to improve phase sequencers, maintaining their capability of bidirectionally driving a stepping motor as desired, while exhibiting extreme simplicity.

Referring to FIGS. 3A and 3B, we can represent the state of the two phase windings of a bipolar motor or the four windings of a unipolar motor with the binary digits 0 and 1, in lieu of the + and − indications of FIG. 3A; this is illustrated in FIG. 3B. Viewing FIG. 3B as merely a list of 2-bit binary numbers, I have observed that parity alternates between even and odd. Whenever parity is even (steps 1 and 3) phase B changes state for the next CW step. When parity is odd (steps 2 and 4) phase A changes state for the next CW step. Based on this observation we can implement a phase sequencer which complies with the following process: to step the motor in the CW direction, determine parity and when parity is even change the state of phase B; if parity is odd change the state of phase A.

This method, however, only provides for CW rotation. Now, however we can add a third bit. If this third bit is 0, then the relationship between the parity of the three bit number and the phase change for the next step is as already described, e.g. the third zero bit does not change parity. If however the third bit is a 1, the parity relationship is reversed. Steps 1 and 3 become odd parity steps, and steps 2 and 4 become even parity. If we fix the third bit at one, then, and use the process already described for determining the phase sequence, then the motor steps in the reverse or CCW direction.

There are at least two different techniques for implementing the method described above. In a first embodiment of the invention, we can use a commercially available parity generator. In this embodiment of the invention the parity generator receives as an input signals corresponding to the present phase state of phases A and B. A third input to the parity generator is our direction bit (0 for CW rotation, 1 for CCW rotation). The phase sequencer in accordance with the invention includes, in addition to the parity generator, a pair of flip flops, the state of each of which determines the energization state of a different phase, and a clocking input which determines the step rate, by the pulse rate present on the clocking input. Since the state of the two flip flops determines the energization state of the respective phase windings, the output of the flip flops are also fed back and form two of the inputs to the parity generator. The third input to the parity generator is our direction bit which can be manually controlled (although as will be apparent that is not at all essential). The output from the parity generator asserts either a EVEN or ODD line which provides inputs to the two different flip flops; the flip flops are both clocked in common by the clock input. Since commercially available parity generators typically support nine bits, the same logic components (the parity generator and the two flip flops) required for unidirectional rotation also provide for bidirectional rotation. Since the parity generator includes six inputs in addition to the three inputs we have already described, other inputs are available to "override" the direction bit. For example, each of these other six inputs could be normally tied to zero, but asserting any one of them (changing the signal from 0 to 1) could automatically reverse the motor without altering the direction, or third input.

Inasmuch as many stepper motor controllers are microprocessor based, the invention can also be implemented in such a microprocessor. This implementation is particularly easy in those microprocessors (which are most microprocessors) which have a conditional branch on parity instruction. In lieu of requiring a parity generator, a register (or memory location) is set aside to store a phase/direction byte. For the two phase motor, with direction control, only three bits are required, one bit for each phase and the third bit for the direction. Optionally an additional "override" bit or bits could also be provided. When the next motor step is required, the contents of the phase/direction byte are examined to determine if parity is even or odd; depending on the parity, one or the other of the phase representing bits is complemented and the modified phase/direction byte is restored. The motor phase states are then controlled in accordance with the contents of the phase/direction byte. Accordingly, the invention provides a method of selecting a new phase state for a two phase step motor comprising the steps of:

(a) determining parity for a binary combination represented by existing phase states of two phases of said step motor, and (b) changing the phase state of one or the other of the two phases in dependence on the parity determined in step (a).

In accordance with another embodiment, the invention provides apparatus for selecting a new phase state for a two phase step motor comprising:

(a) means for determining parity for a binary combination represented by existing phase states of said two phases, and (b) means for changing the phase state of one or the other of said phases in response to the parity determined by said means for determining parity.

BRIEF DESCRIPTION OF THE DRAWINGS

The present invention will now be described in further detail to ensure that those skilled in the art can make and use the same, in the following portions of the specification when taken in conjunction with the attached drawings in which:

FIG. 1 is a block diagram showing application of the invention for use with a conventional step motor;

FIG. 2 illustrates in graphical form the various energization states of the phase windings of the step motor and the alteration of that energization in desired sequences;

FIG. 3A is a tabular version of FIG. 2;

FIG. 3B is a continuation of FIG. 3A showing the information in a different form;

FIG. 3C is an addition to FIG. 3B which indicates parity for the states of FIGS. 3A and 3B;

FIG. 4 is similar to FIGS. 3A–3C with the addition of a direction bit, and in FIG. 4 the direction bit is 0;

FIG. 5 is a continuation of FIG. 4 for those cases in which the direction bit is 1;

FIG. 6 is a schematic of one embodiment of the phase sequencer of the invention for application in the block diagram of FIG. 1;

FIGS. 7A, 7B and 8 illustrate a software implementation of the present invention.

DETAILED DESCRIPTION OF PREFERRED EMBODIMENTS

FIG. 1 is a block diagram showing the combination of a step motor 10, a phase sequencer 20 and a step command source 30. The power source and power driver for the step motor 10 are not explicitly illustrated and can be assumed to be included in block 10. In the case of a bipolar step motor, the phase sequencer 20 has an output 20A which identifies, by the signal carried on the conductor 20A, the polarity of energization for the step motor phase winding A, and by the signal carried on a conductor 20B identifies the polarity of energization of the step motor phase B. The phase sequencer 20 receives a step command on its input from the command source 30. The timing of commands from the command source controls the step rate of the motor. The command source may also provide direction information to the phase sequencer 20. Many possible implementations exist for command source 30, including manually controlled switches, fixed or variable frequency pulse generators, timer-based digital logic, or software control in a digital computer. For each pulse received by the phase sequencer 20, the energization state of the step motor is altered; that alteration proceeds in a predetermined sequence, and the sequence determines the direction of rotation of the step motor. FIG. 2 shows the energization polarity for phases A and B of the step motor 10. For an energization sequence of step 1-2-3-4, the step motor 10 may rotate in a clockwise direction. On the other hand, for an energization sequence of 1-4-3-2-1, the step motor 10 may rotate in a counter-clockwise direction.

On the other hand, the step motor 10 may include a pair of bifilar wound unipolar energization windings, also producing a four step rotation sequence. In that event the signal on output 20A identifies whether the first or the second of the bifilar windings in phase A is to be energized and similarly, the signal on conductor 20B identifies which of the two bifilar windings in phase B is to be energized.

FIG. 3A illustrates, in tabular form, the information shown graphically in FIG. 2. More particularly, for each of steps 1–4, the polarity of energization of the phase A or B is identified. In the case of the unipolar energization, we can consider that + identifies one of the two windings energized and − indicates the other of the two windings is energized. FIG. 3B merely restates the same information shown in FIG. 3A, but using the binary characters 0 and 1 in lieu of the + and − characters.

The invention is based on the recognition that parity of the binary representation of the motor phase states alternates as the step motor proceeds through its various phase states; FIG. 3C identifies parity for each of the four different states. As shown in FIG. 3C, the states corresponding to steps 1 and 3 have even parity, whereas the states corresponding to steps 2 and 4 have odd parity. Accordingly, if parity is even the next step in the clockwise direction is taken by changing the energization state of phase B, and if parity is odd then the next step is taken by changing the energization state of phase A. This can be verified by comparing FIGS. 3A-3C, note that the downward directed arrow in FIG. 3C identifies the clockwise rotation.

It should also be apparent from FIG. 3C that in order to obtain counterclockwise rotation, we must reverse the rule. However, this reversal can be accomplished in a simpler fashion, as shown in FIG. 4. FIG. 4 is similar to FIGS. 3A-3C except that now instead of identifying only the energization state of phases A and B, it also includes a third bit (DIR) corresponding to a direction bit. In the event that the direction bit is zero (as is the case for each state in FIG. 4) then the parity relationship between the energization states of the various phases remains unchanged. On the other hand, when the direction bit is a logic 1 (as opposed to a logic 0), then the parity relationship, of the phase state and direction bit representations is reversed—see FIG. 5.

Using the direction bit we can always determine that the energization state for phase B will change when parity is even, and the energization state for phase A will change when parity is odd, in order to produce the desired rotation. That rotation will be clockwise when our direction bit is a logic 0 (see FIGS. 3A-3C and FIG. 4) and will be counterclockwise if the direction bit is a logic 1 (see FIGS. 3A-3C and FIG. 5).

FIG. 6 shows a schematic diagram of a phase sequencer 20 in accordance with the invention. The phase sequencer includes the parity generator 21 and flip flops 22 and 23. As shown in FIG. 6, the output of the step command source 30 is the CLOCK, DIR, and OVERRIDE signals. The step command source 30 generates a CLOCK pulse at the time the motor is to be stepped. DIR is a logic level output which specifies the direction of the step as shown in FIGS. 4 and 5. OVERRIDE is another (optional) logic level output which, when asserted, inverts the meaning of the DIR signal.

Toggle flip-flops 22 and 23 store the existing phase state of the motor. The CLOCK signal provides the clock input to the flip-flops. The Q outputs of flip-flops 22 and 23 specify the phase states A and B, respectively. DIR, OVERRIDE and phase states A and B are provided as inputs to the parity generator 21.

The parity generator 21 has an EVEN output and an ODD output. The EVEN output will be asserted if the combination of inputs to the parity generator has even parity; otherwise the ODD output will be asserted. The ODD output provides the T input to flip-flop 22 and the EVEN output provides the T input to flip-flop 23. The T input of the flip-flops is the result of tying together the J and K inputs of a JK flip-flop. A pulse at the clock input of the flip-flop will cause the flip-flop to change state if the T input is asserted. Thus, each pulse of the CLOCK signal causes one or the other of flip-flops 22 and 23 to change state, which changes the energization state of the associated phase winding.

A TTL form of a suitable parity generator 21 is part 74180. The flip flops 22 and 23 can be TTL series 7473.

In operation, at any time the parity generator 21 responds to the logic signals on its inputs. If parity (the number of inputs at logic 1) is even, then the EVEN output is asserted (logic 1) and the ODD output is inactive (logic 0). In this state, on the next clock pulse the flip flop 23 changes state to change the energization state of the phase B. On the other hand, if parity was odd then the next clock pulse changes state of phase A. When either one of the flip flops changes state, the input to the parity generator provided by the output of that flip flop also changes state and consequently (assuming the other inputs are maintained) the output of the parity generator 21 also changes (from even to odd or odd to even).

From the preceding description, it should also be apparent that altering the condition of the DIR bit (from logic 1 to logic 0 or logic 0 to logic 1) will reverse the direction of the step motor on the next and succeeding clock pulses.

Most commercially available parity generators, such as 74180, support significantly more than the three bits already described. This allows us to use an additional, override bit. If such a bit is maintained at a logic 0 state, then it will have no effect on the direction of motion of the step motor. On the other hand, if we wish to take an occasional back step, one reverse to the direction of the prevailing direction of the step motor, then we merely assert the override bit for that step. Theoretically, we could have as many override bits as there are unused inputs to the parity generator 21, each overriding or reversing the significance of the other inputs to the parity generator. Unused inputs of the parity generator should be tied to logic 0.

The block diagram of FIG. 1 also describes a digital computer embodiment of the invention. Use of a computer to implement the timing and direction control functions of step command source 30 is known in the art. In the preferred embodiment, both the functions of step command source 30 and phase sequencer 20 are implemented with the same computer. An example of a suitable computer is the Intel 8051.

An overview flow diagram of the present invention is shown in FIGS. 7A and 7B. The initialization routine (FIG. 7A) typically is employed during the power-on initialization of the computer. The step routine (FIG. 7B) is called or used each time the motor is to be moved one step.

The digital computer includes a register or read/write memory location, which for convenience may be named the phase/direction byte, which stores the stepper motor phase states. This register will include at least two significant bits, one bit dedicated to each of the phases. It may also include a third bit dedicated to the direction command. Additional direction override bits, for example a fourth backstep bit, may also be included in the phase/direction byte. The length of the phase/direction byte will typically correspond to the bit length of the computer (e.g. 8 bits for the Intel 8051).

During the initialization process of the computer, the phase energization bits of the phase/direction byte are initialized to correspond to the actual initial phase energization state of the motor. The direction and override bits, if any, are initialized to the desired motor direction. Any unused bits in the phase/direction byte are initialized to zero.

When a step from the step motor is desired, the step routine (FIG. 7B) is called to determine the next phase state of the motor and control the phase energization of the motor to this next phase. The timing function which determines when to call the step routine is known in the art of computer-based motor control and is outside the scope of the present invention.

The primary function of any phase sequencer is to determine the next motor phase. The detailed flow diagram of the process of the present invention is shown in FIG. 8.

Referring to FIG. 8, the first operation 81 accesses the phase/direction byte. Typically, this may require copying the contents of the phase/direction byte into a special purpose register such as the accumulator. Alternately, the phase and direction bits may be stored in separate memory locations or obtained from a combination of memory and input port. In this case, operation 81 generates a combined phase/direction byte from the separately stored phase and direction information.

The next operation 82 determines if the parity of the phase/direction byte is even or odd. Operation 82 can be implemented by adding each of the individual bits in the phase/direction byte and branching on whether the total sum is even or odd. If the computer includes a conditional branch on parity instruction, operation 82 is implemented using a conditional branch instruction. If parity is not even, then operation 83 is performed to complement the bit in the phase/direction byte corresponding to phase A. On the other hand, if parity is even, then operation 84 is performed to complement the bit in the phase/direction byte corresponding to phase B. After either operation 83 or 84 is performed, operation 85 is performed to update the phase/direction byte by substituting for the bit which had been complemented, the result of the complementing step. For example, if the phase/direction byte included the contents 1-0-1 (for phase A, phase B and DIR, respectively), then parity would be even, the bit corresponding to phase B would be complemented and when the phase/direction byte is updated the contents would be 1-1-1.

Having updated the phase/direction byte, when the output operation is performed (see FIG. 7) the energization state for phase B is altered in order to produce the desired next step.

While the preceding has described two preferred embodiments of the invention, it should be apparent that many changes can be made within the spirit and scope of the invention. For example, I have described obtaining CW rotation with a logic 0 DIR bit; it should be apparent this selection is only exemplary and those skilled in the art will appreciate that CCW rotation could, alternatively, be achieved with a logic 0 DIR bit.

Having thus described my invention, what I claim as new, and desire to secure by Letters Patent is:

1. A method of selecting a new phase state for a two phase step motor comprising the steps of:
   (a) determining parity for a binary combination represented by existing phase states of two phases of said step motor, and
   (b) changing the phase state of one or the other of said two phases in dependence on parity determined in step (a).

2. The method of claim 1 in which said step (a) determines parity on a binary combination formed by the phase states of said step motor and a direction bit.

3. The method of claim 1 in which said step (a) is implemented with a parity generator coupled to phase windings of said step motor.

4. The method of claim 1 in which step (a) is implemented by summing phase state representing bits stored in a register of a computer.

5. The method of claim 3 which includes providing a direction signal corresponding to a desired motion direction for said motor and in which
   said determining step examines both said phase states and said direction signal.

6. The method of claim 4 which includes providing a direction bit corresponding to a desired motion direction for said motor and in which said determining step examines both said phase states and said direction bit.

7. Apparatus for selecting a new phase state for a two phase step motor comprising:
   (a) means for determining parity for a binary combination represented by existing phase states of said two phases, and
   (b) means for changing the phase state of one or the other of said phases in response to parity determined by said means for determining parity.

8. The apparatus of claim 7 in which said means for determining parity includes means responsive to a binary combination formed by the phase states of said step motor and a direction bit.

9. The apparatus of claim 7 in which said means for determining comprises a parity generator.

10. The apparatus of claim 9 further including means for indicating a desired direction of movement for said motor through a direction signal and in
    which said means for determining parity determines parity based on said existing phase states and said direction signal.

11. The apparatus of claim 7 in which said means for determining parity includes means for summing bits representing said phase states, said bits being stored in a register in a computer.

12. The apparatus of claim 11 further including means for indicating a desired direction of movement for said motor through a direction bit and in which said means for determining parity determines parity based on said existing phase states and said direction bit.

* * * * *